United States Patent
Sagoo et al.

(10) Patent No.: US 8,126,192 B2
(45) Date of Patent: Feb. 28, 2012

(54) APPARATUS AND METHOD FOR CREATING DIGITAL COLLAGE

(75) Inventors: KiranPal Sagoo, Seongnam-si (KR); Ju-youn Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1053 days.

(21) Appl. No.: 11/854,851

(22) Filed: Sep. 13, 2007

(65) Prior Publication Data

US 2008/0205694 A1    Aug. 28, 2008

(30) Foreign Application Priority Data

Feb. 27, 2007  (KR) .................. 10-2007-0019625

(51) Int. Cl.
*G06K 9/00* (2006.01)
(52) U.S. Cl. ........................ 382/100; 382/276
(58) Field of Classification Search .................. 382/100, 382/276; 707/1; 715/750
See application file for complete search history.

(56) References Cited

U.S. PATENT DOCUMENTS

| | | | | |
|---|---|---|---|---|
| 7,143,357 B1 * | 11/2006 | Snibbe et al. | ................. | 715/751 |
| 7,783,703 B2 * | 8/2010 | Rafey et al. | .................... | 709/204 |
| 2005/0114759 A1 * | 5/2005 | Williams et al. | ............. | 715/512 |
| 2005/0198578 A1 * | 9/2005 | Agrawala et al. | ............. | 715/750 |
| 2006/0041678 A1 * | 2/2006 | Morris | .......................... | 709/236 |
| 2006/0161621 A1 * | 7/2006 | Rosenberg | .................... | 709/204 |
| 2007/0198534 A1 * | 8/2007 | Hon et al. | ....................... | 707/10 |

FOREIGN PATENT DOCUMENTS

| | | |
|---|---|---|
| JP | 2001-285420 | 10/2001 |
| JP | 2004-208210 | 7/2004 |
| KR | 2006-65213 | 6/2006 |
| KR | 2006-76827 | 7/2006 |

* cited by examiner

*Primary Examiner* — Stephen Koziol
(74) *Attorney, Agent, or Firm* — NSIP Law

(57) ABSTRACT

A method and apparatus for creating a digital collage, the apparatus including a sending/receiving unit and a creating unit, the sending/receiving unit receiving contents from a plurality of slave devices, and the creating unit merging the received contents in a predetermined form to create the digital collage.

19 Claims, 13 Drawing Sheets

APPARATUS AND METHOD FOR CREATING DIGITAL COLLAGE

CROSS-REFERENCE TO RELATED APPLICATION

This application claims the benefit of Korean Application No. 2007-19625 filed on Feb. 27, 2007, in the Korean Intellectual Property Office, the disclosure of which is incorporated herein by reference.

BACKGROUND OF THE INVENTION

1. Field of the Invention

An aspect of the present invention relates to an apparatus for and a method of creating a digital collage, and more particularly, to an apparatus for and a method of creating a digital collage which enable a unique collage to be produced by combining contents made by a plurality of users.

2. Description of the Related Art

Recently, mobile devices such as personal digital assistants (PDA), personal communication systems (PCS), etc., with a built-in camera have been widely used to enable users to photograph images or make videos at any time and in any place.

Furthermore, users can access various websites using certain programs in mobile devices and communicate with one another. For instance, users access websites such as MySpace and Facebook through mobile social software (MoSoSo) to communicate with one another in a community environment.

Also, users upload their photos and videos to personal homepages to share them with others.

However, there is a need for a method of creating contents which can reflect a user's personality and sentiment and build a bond between users.

SUMMARY OF THE INVENTION

An aspect of the present invention provides an apparatus for and a method of creating a digital collage which enables a unique collage to be produced by combining contents made by a plurality of users.

According to an aspect of the present invention, there is provided an apparatus for creating a digital collage, the apparatus including a sending/receiving unit of a host device which receives contents from a plurality of slave devices, and a creating unit which merges the contents in a predetermined form to create the digital collage.

According to another aspect of the present invention, there is provided an apparatus for creating a digital collage using a story template, the apparatus including a sending/receiving unit which receives contents made by combining objects selected from the story template in a slave device, and a creating unit which creates the digital collage using the contents.

According to still another aspect of the present invention, there is provided a method of creating a digital collage by merging contents in a predetermined form, the method including selecting a plurality of members using a host device of a user, sending a request message for creating the contents to slave devices of the members, receiving and merging the contents made by the members, and creating the digital collage using the merged contents.

According to a further aspect of the present invention, there is provided a method of creating a digital collage using a story template, the method including receiving contents produced by combining objects selected from the story template in a slave device, and creating the digital collage using the contents.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
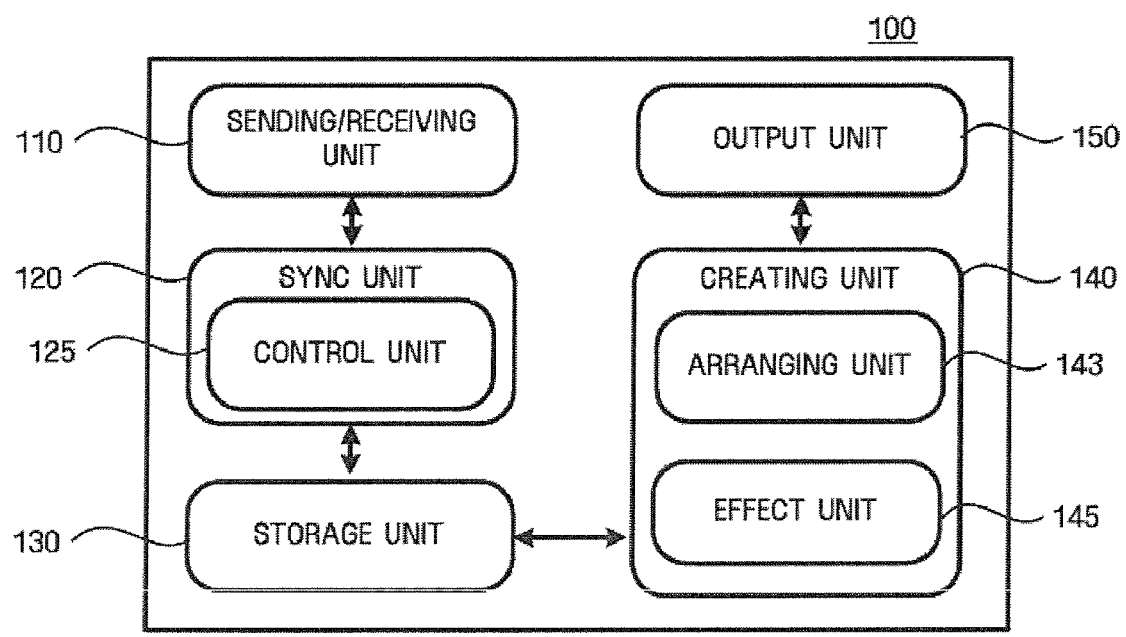
FIG. 1 is a block diagram of an apparatus for creating a digital collage according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for creating a digital collage according to an embodiment of the present invention. Referring to FIG. 1, an apparatus 100 for creating a digital collage includes a sending/receiving unit 110, a sync unit 120, a storage unit 130, a creating unit 140, and an output unit 150. The sync unit 120 includes a control unit 125, and the creating unit 140 may include an arranging unit 143 and an effect unit 145. The apparatus 100 may be implemented as a mobile device or a communication device with a display device. In some embodiments, the elements of the apparatus 100 may be incorporated into a host device, that is, a user's mobile device.

The sending/receiving unit 110 receives contents from a plurality of members that are selected by the host device of the user. The host device may be a mobile device of the user, and the user selects the members that will produce the contents from a list stored in the mobile device. Then, the user sends a message through the sending/receiving unit 110 to request the members to create contents. Mobile devices (slave devices) of the members receive the request message from the host device, and the members make the contents and then send the contents to the host device. Thus, the host device receives the contents from the members though the sending/receiving unit 110. Afterwards, the host device is able to send a digital collage that is completed by combining the plurality of contents to a certain device through the sending/receiving unit 110. In this case, the combining of the contents may include merging or arranging the contents.

Meanwhile, when a member refuses to participate in the production of the digital collage, a refusal message about the request message may be sent automatically to the host device from the slave device through the sending/receiving unit 110 to let the user know. Also, when the member who received the request message agrees to create the digital collage, an acceptance message may be sent automatically to the host device from the slave device of the member through the sending/receiving unit 110 to let the user know the request result.

According to another exemplary embodiment of the present invention, the sending/receiving unit 110 may receive a story template, which will be described later in reference to FIG. 9, from a service provider. The story template includes a plurality of objects, and the objects may be background images or characters which are necessary to create the digital collage. Moreover, the story template may be divided into several sections, each section comprising a different kind of object. Then, the sending/receiving unit 110 sends the received story template to the members (slave devices), and the members select certain objects from the story template according to their roles for the digital collage and then produce the contents. Here, when the order of sending the contents, that is, the order of producing the contents is already set by the user, the story template may be sent to each of the members according to the arranged order. A detailed description will be provided later with reference to FIGS. 9 through 12.

The sync unit 120 synchronizes the contents with each member who made the contents and stores the contents in the storage unit 130, which will be described later. The sync unit 120 may synchronize information about the members who participated in making the digital collage with the digital collage or synchronize the creation date of the digital collage with the digital collage and then store the contents in the storage unit 130. In this case, the digital collage is made by combining the received contents, which can be stored as an image file, a video file, or an application file. Furthermore, the sync unit 120 may include a control unit 125 determining whether or not the received content is sent from the slave device which received the request message.

That is, the control unit 125 may determine whether or not the received content is sent from a selected member, select only corresponding content for the digital collage, and then store the content in the storage unit 130.

The storage unit 130 stores the contents and the digital collage that is created by the creating unit 140. Also, the storage unit 130 may store information on members selected by the host device, the content made by each of the members, the digital collage, and pieces of information generated by synchronizing the members who participated in creating the digital collage with the content. In this case, the pieces of information may be stored according to the times and dates of creation, which allow history information of the contents made by the members and digital collages created by combining the contents to be managed. That is, the user can select certain members from a member list stored in the storage unit 130, and check the digital collage and contents that the members are involved in. Furthermore, the user can select a certain digital collage from the storage unit 130, and check information about the members who participated in creating the selected digital collage. The storage unit 130 may be a flash memory, a memory chip, or a hard disk or any other type of memory device. In another exemplary embodiment, the storage unit 130 may store a story template received from a service provider.

The creating unit 140 creates a digital collage by merging the contents in a predetermined form. The digital collage is made by merging the contents received from a plurality of slave devices, and, for example, may be in a mosaic form where image segments are combined. Since the digital collage is a combination of the contents made by each of the members, it can show the personality of each member. Also, a bond between the members who participated in creating the digital collage can be developed. The plurality of members can cooperatively create the digital collage of the common subject. For example, the members may produce contents with regard to a birthday of a certain member of a family, and the produced contents may be merged to create a digital collage. The creating unit 140 may include the arranging unit 143 for merging the received contents in a predetermined form, and the effect unit that applies effects to the merged contents.

The arranging unit 143 merges the received contents in a predetermined form. The user can preset the merging form from a menu. The received contents can be merged in a default thumbnail form and then be displayed on a screen. The form of the merged contents can be output to the screen by the output unit 150 which will be described later.

The effect unit 145 applies predetermined effects to the received contents. Also, the effect unit 145 may apply predetermined effects to the created digital collage. The received contents can have a variety of forms, including images, letters, videos, etc. The effect unit 145 may distort shapes of letters in the received contents or digital collage into flame shapes, or change a color image into a black and white image. In addition, the effect unit 145 may apply various filtering effects including sketch, sharpen, render, noise, invert, and posterize to the received contents or the created digital collage.

According to another exemplary embodiment of the present invention, the creating unit 140 may produce content by combining objects selected from a story template of the slave device. Content completed in a first mobile device (i.e., a first slave device) is sent to a second mobile device (i.e., a second slave device), and the second mobile device merges the received content with a certain object selected from a story template. In this manner, a final content, which is created by merging a plurality of objects, is sent to the host device, to then be used to create the digital collage. Here, the order of producing the contents of the mobile devices may be preset by the user (the host device), and the story template may be sent to each mobile device according to the arranged order.

The output unit 150 outputs the digital collage to a screen of the output unit. Also, the output unit 150 may display information about members who participated in creating the digital collage. Moreover, the output unit 150 may display information about the members and the contents contributed by each member in a list form. The output unit 150 may be a module which includes an image display, such as a cathode ray tube (CRT), a liquid crystal display (LCD), a light emitting display, an organic light emitting display, or a plasma display panel, which can display input image signals.

In FIG. 1, the term 'module', as used herein, refers, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 2:
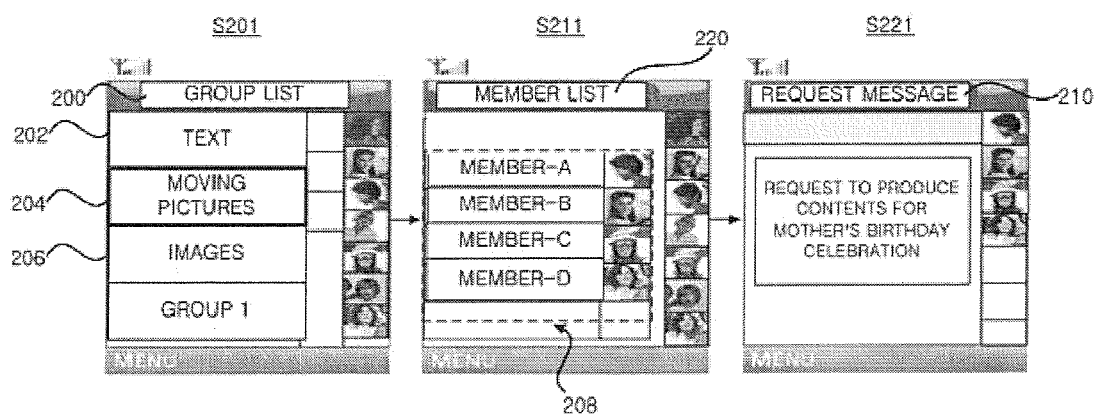
FIG. 2 shows screenshots for explaining how a user selects a member who will participate in creating a digital collage from a list provided by a host device according to an embodiment of the present invention.

FIG. 2 shows screens where a user selects members who will participate in creating a digital collage from a list provided by a host device according to an exemplary embodiment of the present invention.

For example, it is assumed that the user intends to make a digital album as a birthday present of a user's mother and send the digital album to a mobile device of the mother. Also, it is assumed that the number of family members of the user is four, and members are called member-A, member-B, member-C, and member-D, respectively. The user requests each member to produce contents for the digital album. Here, the contents may be digital data including text, photos, and videos. To request the members, first, the user selects the family members from the list stored in the user's mobile device (a host device). In this case, the list may be a general address book or a group list. In the case of the group list, when, for example, a group A is selected, members belonging to the group A can be selected at the same time.

As shown in FIG. 2, a group list 200 may be comprised of a text group 202, a video group 204, and an image group 206. The user can select a desired group, and select members who will participate in creating a digital collage from the group. Here, the text group 202 may include a list of members who already participated in creating a previous digital collage with regard to a particular subject and made and sent texts to the host device, and the video group 204 may include a list of members who already participated in creating a previous digital collage with regard to a certain subject and made and sent videos to the host device. Therefore, the user can easily select members who will produce specific content from the corresponding list.

First, the user selects the video group 204 (S201), and selects the member-A, the member-B, the member-C, and the member-D (S211). At this time, pieces of information of the selected members are arranged in a text or image form and displayed on a screen of the user's host device in a certain axial direction, thereby allowing the user to check the selected members.

The user makes a message to request each member to produce content for the digital collage (S221). For example, as shown in FIG. 2, the user makes a request message 210 that asks the members to make contents for celebrating a mother's birthday. When the user makes the request message 210 and then sends the request message 210 to the selected member, each of members' mobile devices (slave devices) receives the request message 210.

Members who communicate frequently with the user to produce contents may be grouped into a list automatically, and then be provided to the user. Here, the list may be composed of characteristic images of respective members. The characteristic image of the member (for example, the member-A) may be content that the member-A has produced most recently, or photo data of the member-A.

Figure 3:
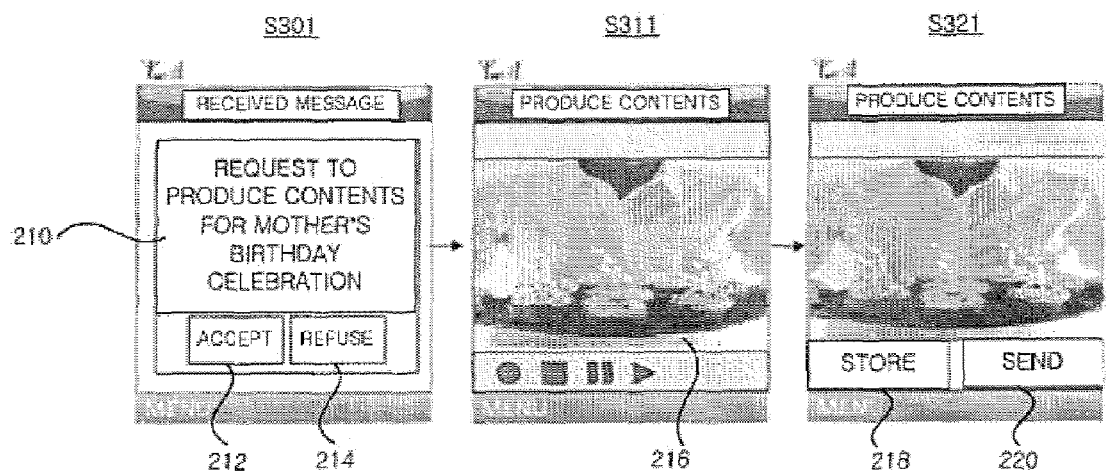
FIG. 3 shows screenshots for explaining procedures of producing contents which are used for the digital collage according to an embodiment of the present invention.

FIG. 3 shows screenshots for explaining procedures of producing contents which are used for the digital collage according to the current embodiment of the present invention. As shown in FIG. 3, the members who receive the request message 210 may produce contents (texts, videos, photos, etc.) using their mobile devices. In this case, the members that received the request message 210 may accept 212 or refuse 214 to make the contents for the digital collage (S301). When the member, who received the request message 210, refuses to make the contents, a refusal message is sent automatically to the host device, so that the user can know the request result. Hereinafter, it is assumed that the members accept to participate in producing the contents. In the same manner as the refusal message, when the member receives the request message 210 and accepts the request, an acceptance message is sent automatically to the host device and the user can check the request result.

For instance, the member-A and the member-C take photos of families and produce photo content (not shown), the member-B takes a photo of a cake and makes video content 216 with the photo (S311), and the member-D makes text contents (not shown) including a message "Happy birthday to you".

Then, each member stores their contents by clicking a "store" button 218, and sends the contents to the host device by clicking a "send" button 220 (S321).

Figure 4:
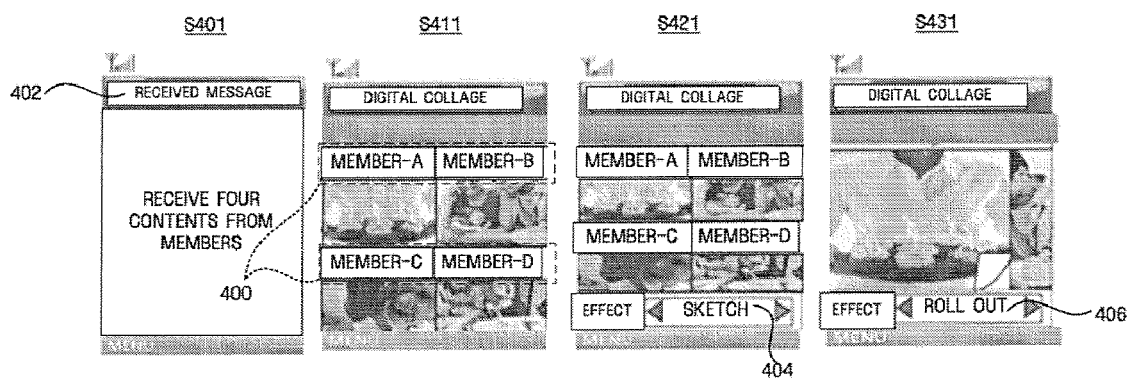
FIG. 4 shows screenshots showing how the contents for the digital collage are merged according to an embodiment of the present invention.

FIG. 4 shows screenshots showing how the contents for the digital collage are merged according to an embodiment of the present invention. As shown in FIG. 4, the user receives the contents, which are made and sent by each member, using the user's mobile device (S401). Here, a receipt message 402 that informs the user that the contents are received may be displayed on a screen of the mobile device, and the receipt message may be combined with the information 400 about the members in a predetermined format and displayed (arranged) on the screen (S411). Also, the information of the members who are selected by the host device and the contents received from the corresponding members may be synchronized together and stored in a predetermined storage area.

The received contents may be merged with each other to create the digital collage and arranged on the screen. That is, the merged contents reflect the personality and sentiment of each member and are tailored to a theme that congratulates the user's mother on her birthday.

Furthermore, the user may select and apply a specific effect to the merged contents. For example, a filtering effect such as sketch 404 or posterize may be applied to the merged contents (S421), or a roll out effect 406 which allows the contents to be turned over page by page like an album (S431).

If 16 contents are received from four members, four contents may be merged together and arranged on the screen at each time. Then, when the user clicks a predetermined button, the arranged four contents are formed as a single file, and thus a total of four digital collages can be generated. Moreover, all of the received 16 contents may be merged together and then be formed as a single image file.

Figure 5:
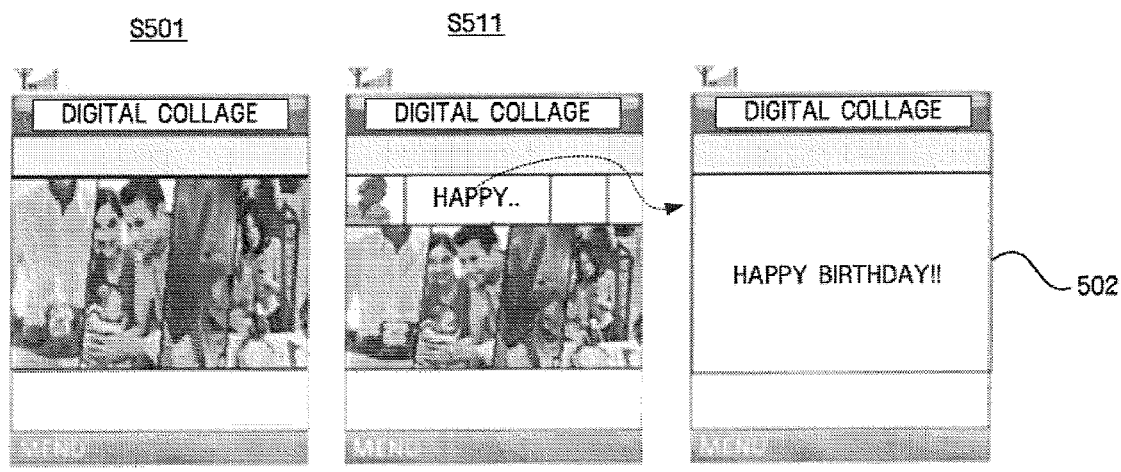
FIG. 5 shows screenshots for explaining procedures of sending the digital collage according to an embodiment of the present invention.

FIG. 5 shows screenshots explaining procedures of sending the digital collage according to an embodiment of the present invention.

As shown in FIG. 5, the user may send the digital collage to his/her mother (S501). As described above, the form of the digital collage is a combination of the received contents, and the digital collage may be an image file, a video file, or an application file. In addition, as described above, the user may preset the combination form of the received contents using a certain menu. Furthermore, the user may set the arrangement form or an effect of the content which will be displayed on the screen in advance.

The user may attach a predetermined message 502 to the digital collage when sending the digital collage (S511). Besides the message 502, the user may attach voice, music, images, icons, or videos to the digital collage. Also, the user may send the information about the members who participated in creating the digital collage with the digital collage.

Figure 6:
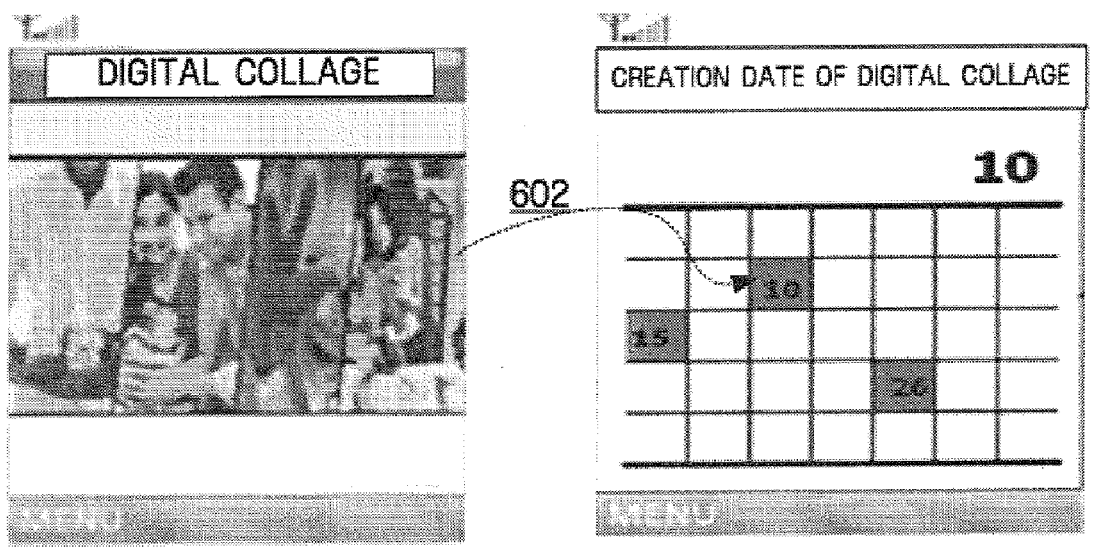
FIG. 6 shows screenshots showing the digital collage and its creation date.

FIG. 6 shows screenshots showing the digital collage and its creation date. As shown in FIG. 6, since the digital collage is synchronized with the creation date 602 of each piece or part of the digital collage contributed by each member, each part of the digital collage can be provided to the user by selecting a specific date. For example, if the digital collage was made on the $10^{th}$ of a certain month, when the user selects the $10^{th}$ of the month from an output screen in a calendar form, the digital collage synchronized with the corresponding date is output and provided to the user. Therefore, in this fashion, a history of the created digital collage can be managed.

Figure 7:
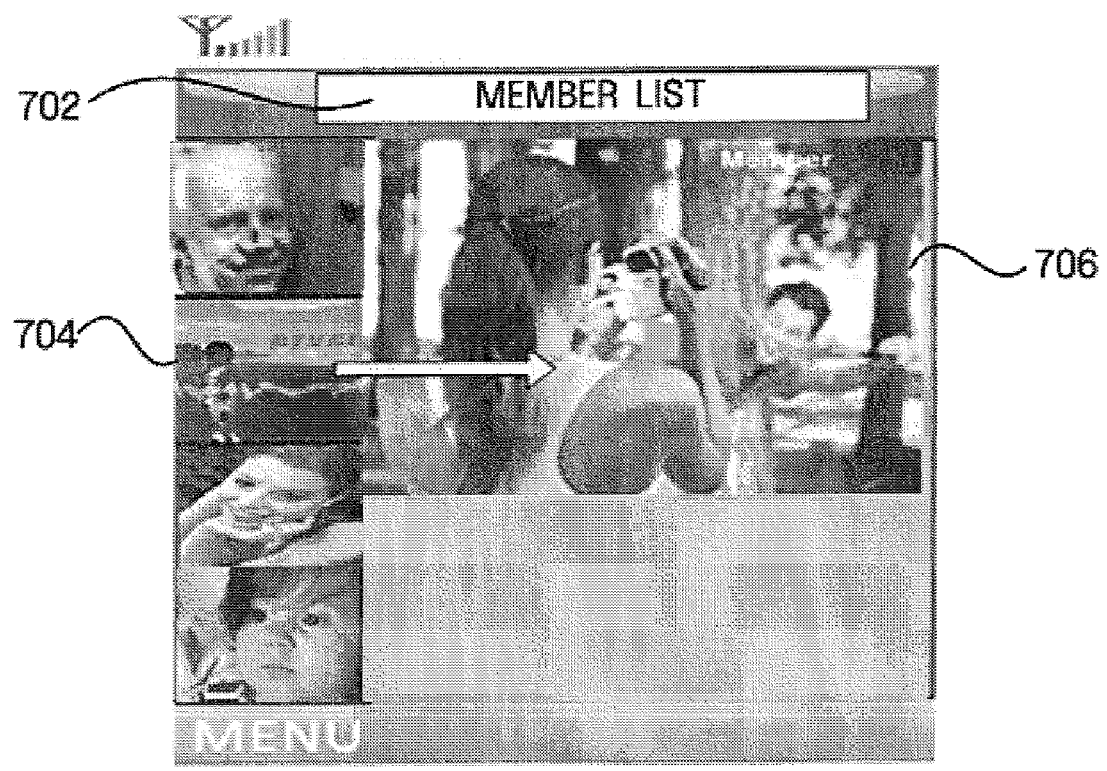
FIG. 7 shows a list of members who participated in creating the digital collage according to an embodiment of the present invention.

FIG. 7 shows a list of members who participated in creating the digital collage according to an embodiment of the present invention. As shown in FIG. 7, information about the members who contribute to creating the digital collage can be displayed as a list 702. When the user selects a specific member 704 from the list 702, the digital collage that the member participated in creating or contents 706 that the member made can be displayed on the screen. In other words, predetermined information (e.g., contact information or a name) of the member and the contents or the digital collage are synchronized together, and thus the relationship between the contents that the member made and the digital collage that includes that contents can be managed.

If there are lots of contents created by a selected member, the contents may be listed in the order in which the contents were created. Accordingly, a history of the contents can be managed, and in the same manner, a history of the digital collages that the member participated in creating can be managed. In addition, when the user places a pointer on a predetermined position of the digital collage, information of the member who made the part of the digital collage where the pointer is placed may be displayed on the screen. By doing this, the user can get information of each of the members who made each part of the digital collage.

Figure 8:
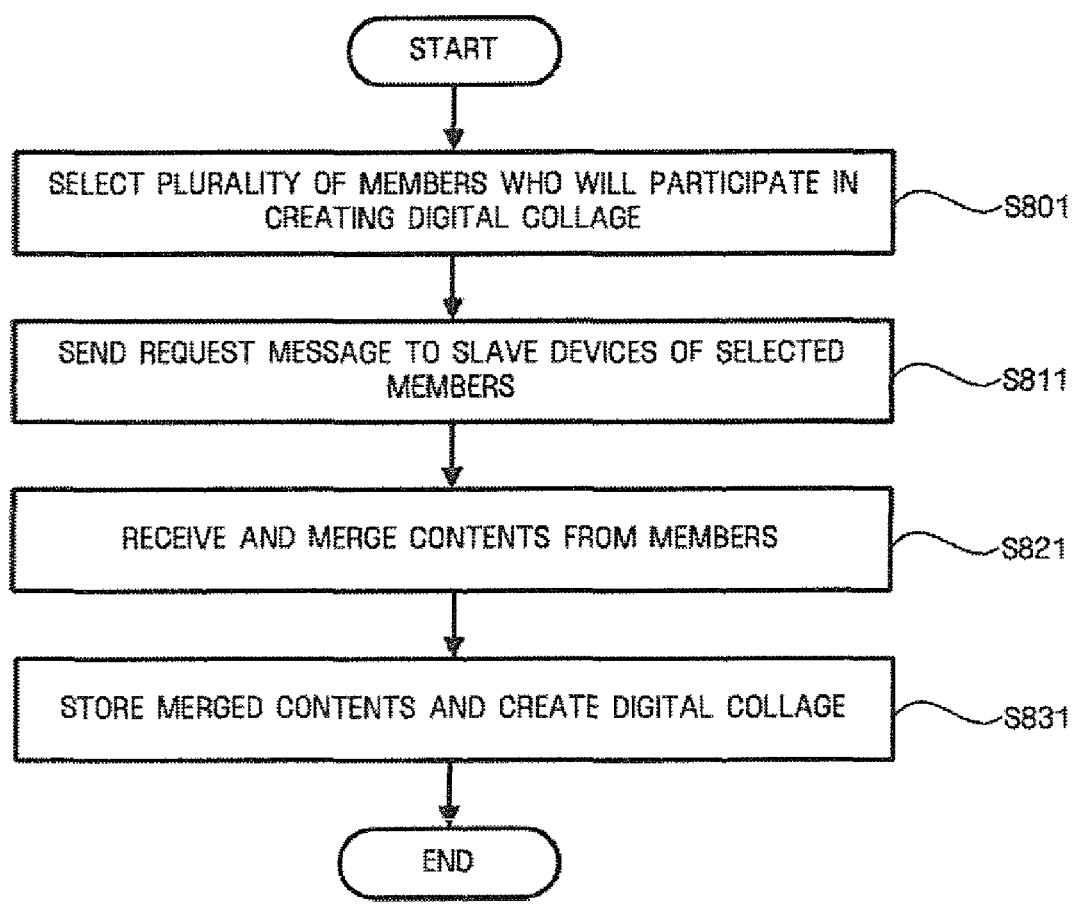
FIG. 8 is a flowchart of a method of creating a digital collage according to an embodiment of the present invention.

FIG. 8 is a flowchart of a method of creating a digital collage according to an embodiment of the present invention.

First, a user selects a plurality of members who will participate in creating the digital collage from a host device (S801).

Then, the user sends a request message that requests the members to produce contents to slave devices of the members (S811). The members who received the request message make the contents using their slave devices. The contents may include a text, an image, or video. The members may make various forms of contents using, for example, a camcorder, a PDA, or a PCS. Then, the produced contents are sent to the host device.

In the next operation, the host device receives and merges the contents made by the members (S821). The merged contents may be arranged in a predetermined form and displayed on a screen of the host device.

The merged contents are stored to create the digital collage (S831). The digital collage may be stored as an image file, a music file, or a video file. Also, the digital collage may be stored as an application file where a predetermined effect is applied to the digital collage. For instance, if the digital collage was created (produced) as an application file, the contents produced by the members are rolled out like an album page by page, or while the contents are being displayed, a music or voice message may be output together.

Figure 9:
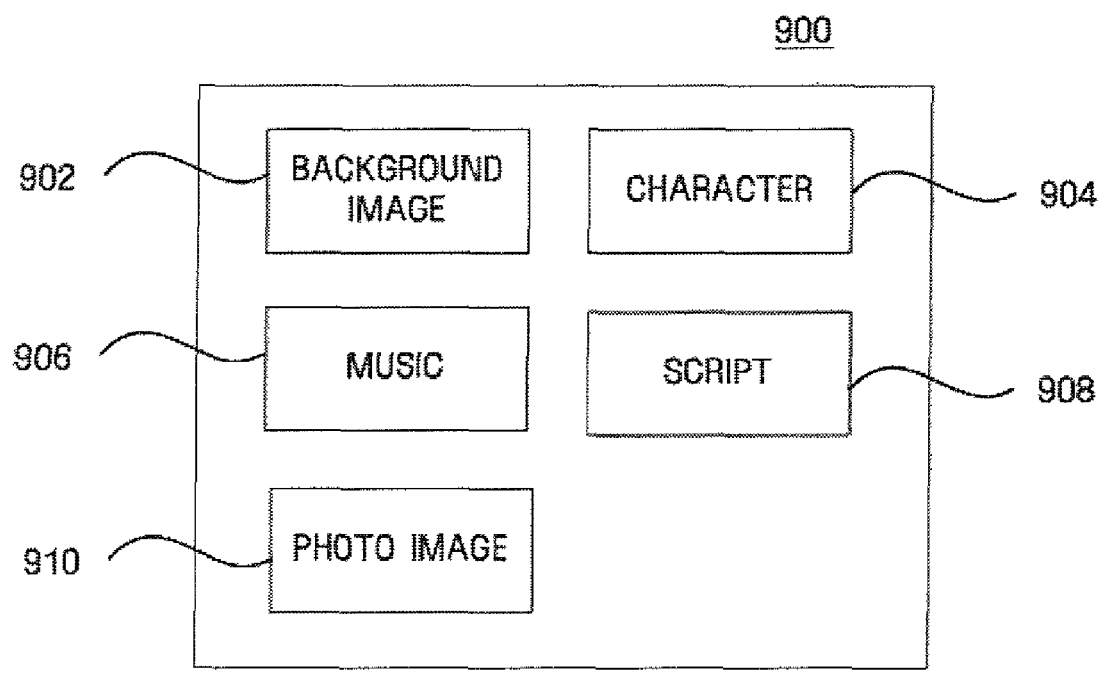
FIG. 9 illustrates a story template according to an embodiment of the present invention.

FIG. 9 shows a story template according to an embodiment of the present invention.

As described above, the host device (the user) requests the slave devices (the members) to participate in creating the digital collage, receives the contents from the slave devices, and combines the received contents to create the digital collage.

Alternatively, besides the method described above, the user may assign roles to the members for the digital collage, and provide the story template 900 to the members according to the assigned roles.

As shown in FIG. 9, the story template 900 may include objects such as a background image 902, character 904, music 906, a script 908 (for example, a dialogue box or a text box), and a photo image 910, and may be divided into sections according to the type of the objects. The story template 900 which includes various sections may be sent to each of the members. Some sections that are necessary to produce the contents may be provided to the members according to the members' roles. Also, the member may receive the story template 900 from the user (the host device), or the member may receive the story template 900 directly from a service provider.

For example, it is assumed the user requests from a member-A, a member-B, a member-C and a member-D to create a character, make a background image, produce a dialogue box for the character, and make music for the character, respectively. In this case, initially, the user can be informed whether or not the members will participate in creating a digital collage by sending and receiving a predetermined message. Then, if the members accept the request, the user can send messages that include the roles of the members. Hereinafter, procedures used by the members to create the digital collage using the story template 900 will be described.

Figure 10:
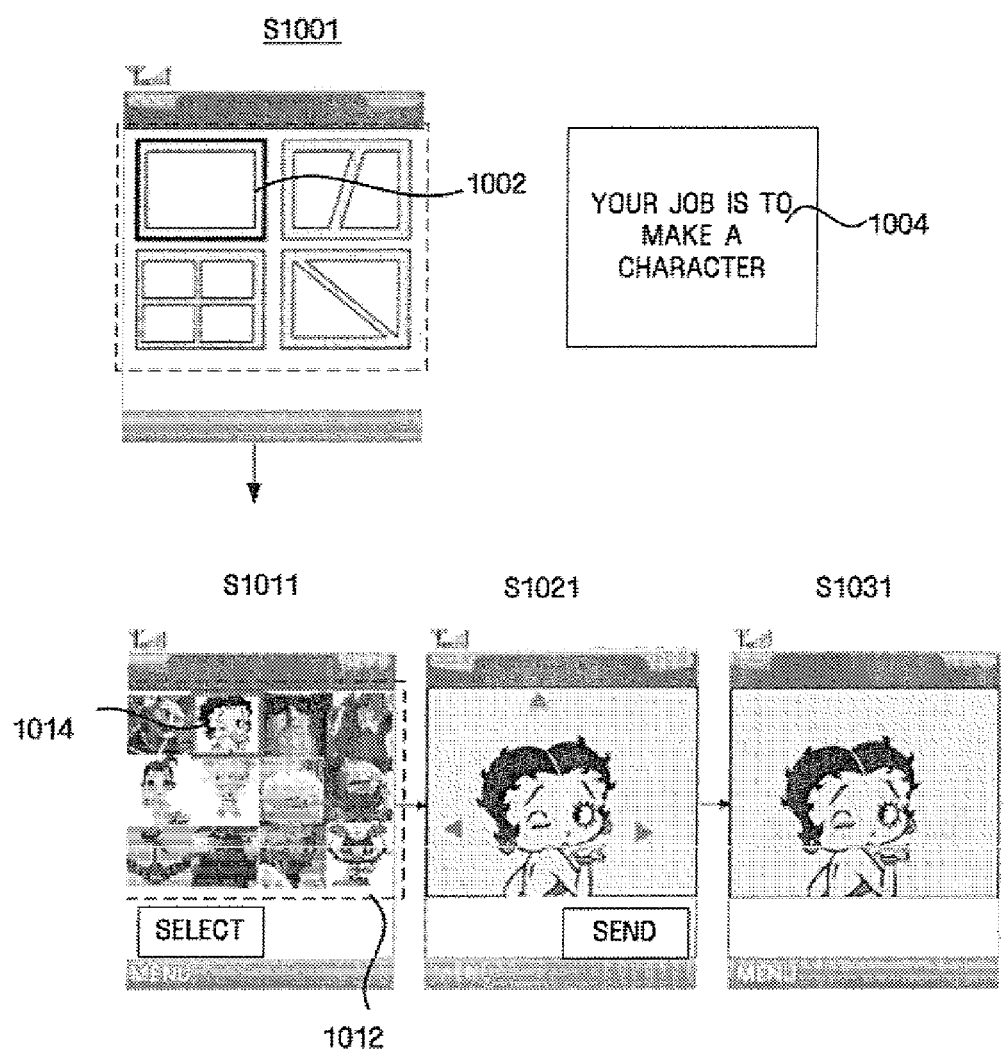
FIGS. 10-12 show screenshots for explaining procedures of creating a digital collage according to an embodiment of the present invention.

As shown in FIG. 10, the user selects a simple form of a content frame 1002 from several content frames, and sends the story template 900 to the member-A (S1001). Here, the user may send a message 1004, which informs the member of his/her role to make a character, together with the story template 900. The content frame may be selected when the user merges the contents to create the digital collage after receiving the contents from the members.

The member-A selects a character section 904 (referring to FIG. 9) from the story template 900 sent from the user based on the simple content frame 1002, and selects a desired character 1014 from characters 1012 included in the character section 904 (S1011).

In the next procedure, the selected character 1014 is placed in the content frame 1002 (S1011), and the member-A sends the character (S1021) that the member-A selected or formed to the member-B (S1031). At the same time, the story template 90 is sent to the member-B.

The story template 900 may be sent between the member-A, the member-B, the member-C, and member-D according to the order in which the contents are to be produced, which is initially arranged by the user. To this end, a set unit (not shown) for setting the order in which the contents are to be produced may be further included in the apparatus 100 in FIG. 1. Thus, when the member-A sends a predetermined message to the host device after finishing selecting or making the character, the host device may send the story template 900 to the member-B. Alternatively, after the member-A completes the character, the member-A may send the story template 900 to the member-B directly.

Figure 11:
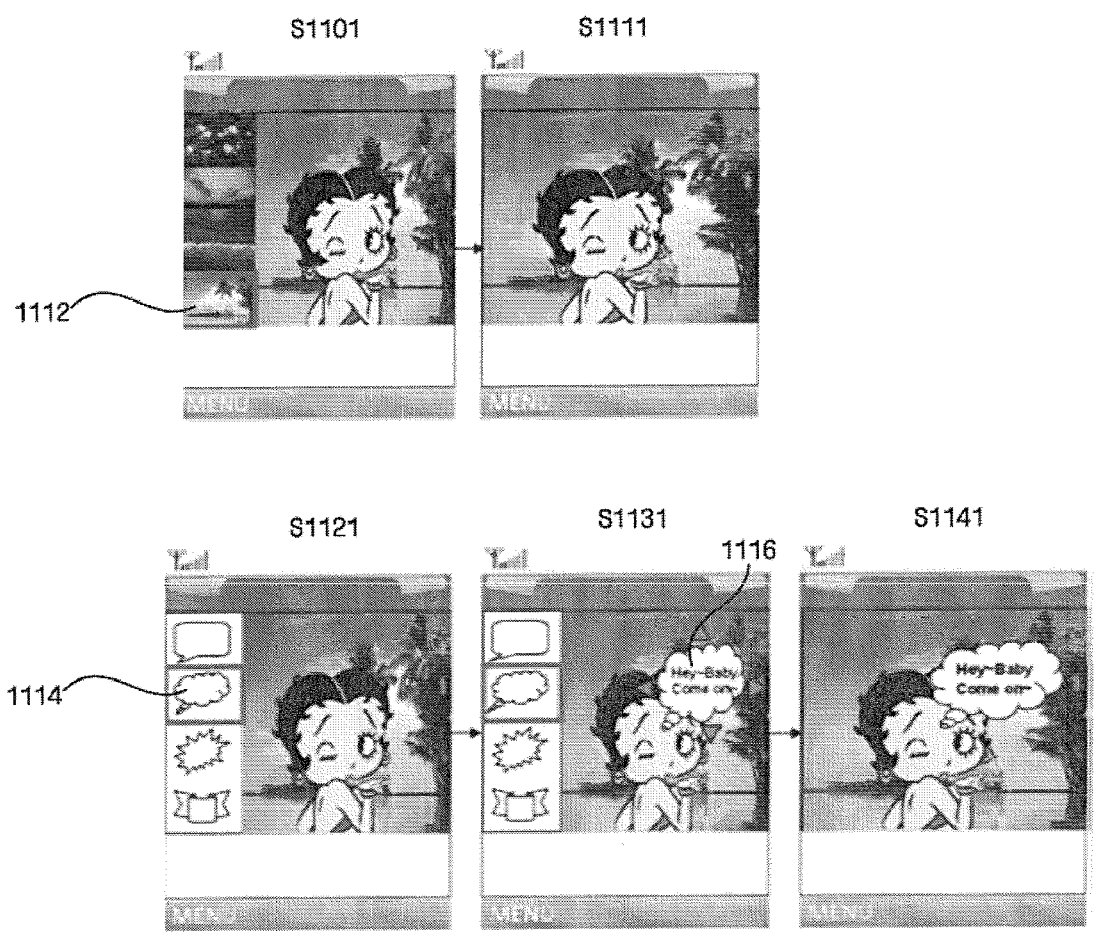
Figure 12:
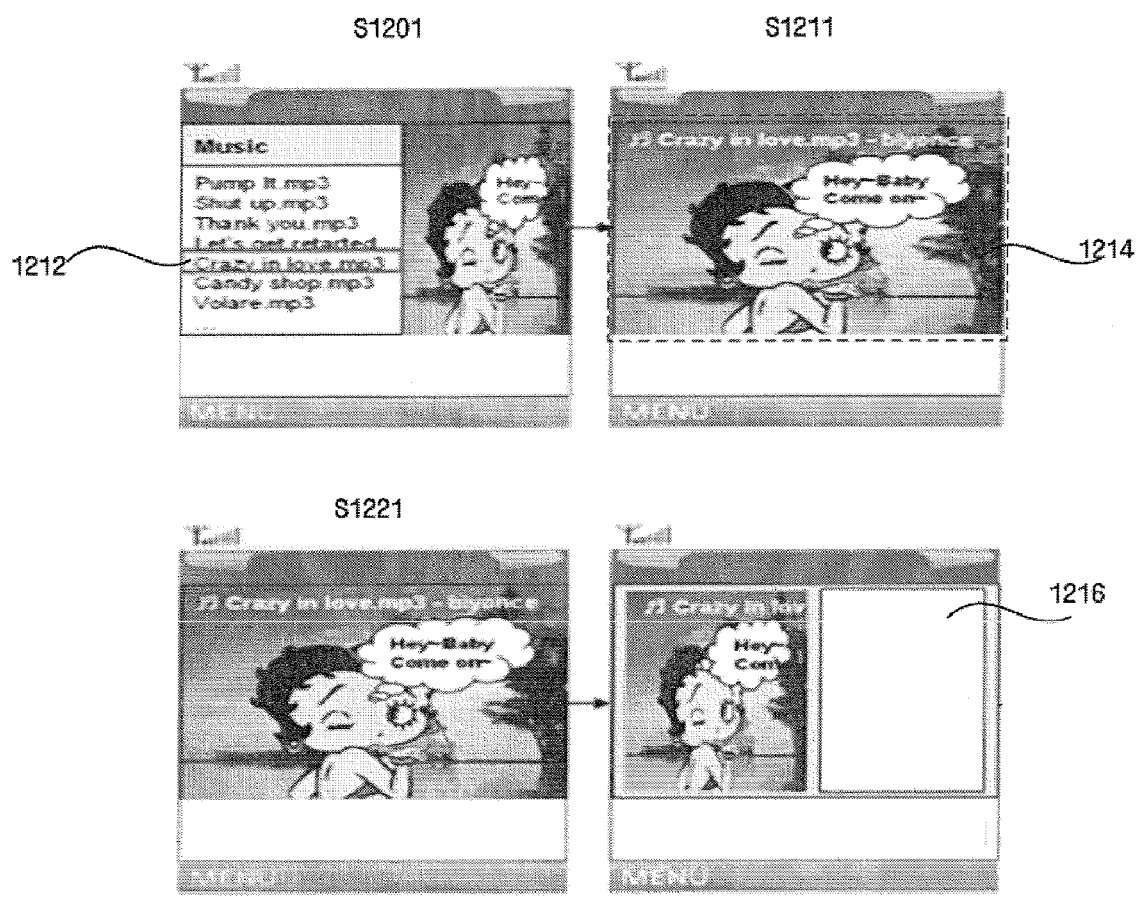

In the next procedure, as shown in FIG. 11, in the same manner as above, the member-B receives the character 1014 and the story template 900 from the member-A, selects the background image section 902 from the story template 900, and selects a desired background image 1112 from background images included in the background image section 902 (S1101).

Then, the creating unit 140 combines the character 1014 received from the member-A with and the background image 1112, and the combined image is output (S1111).

In the same fashion, the member-C receives the character combined with the background image 1112 from the member-B, and produces the dialogue box according to his/her role. To this end, the member-C selects the script section 902 from the story template 900, and selects a desired form from dialogue boxes included in the script section 902 (S1121).

Then, the member-C adds a certain message 1116 to the selected dialogue box 1114 (S1131).

The dialogue box 1114 including the message 1116 is output (S1141).

When the character combined with the dialogue box 1114 is sent to the member-D, the member-D selects the music section 906 from the story template 900 to add music according to his/her role, and selects music 1212 from the music section 906 (S1201).

Then, the music 1212 is applied to the character combined with the dialogue box 1114 by the member-C (S1211).

Finally, the complete content 1214 is sent to the host device of the user (S1221).

In this procedure, the user can store the final complete content 1214 as a digital collage.

Furthermore, the above procedures S1001 to S1221 may be repeated to produce another scene of content 1216.

Figure 13:
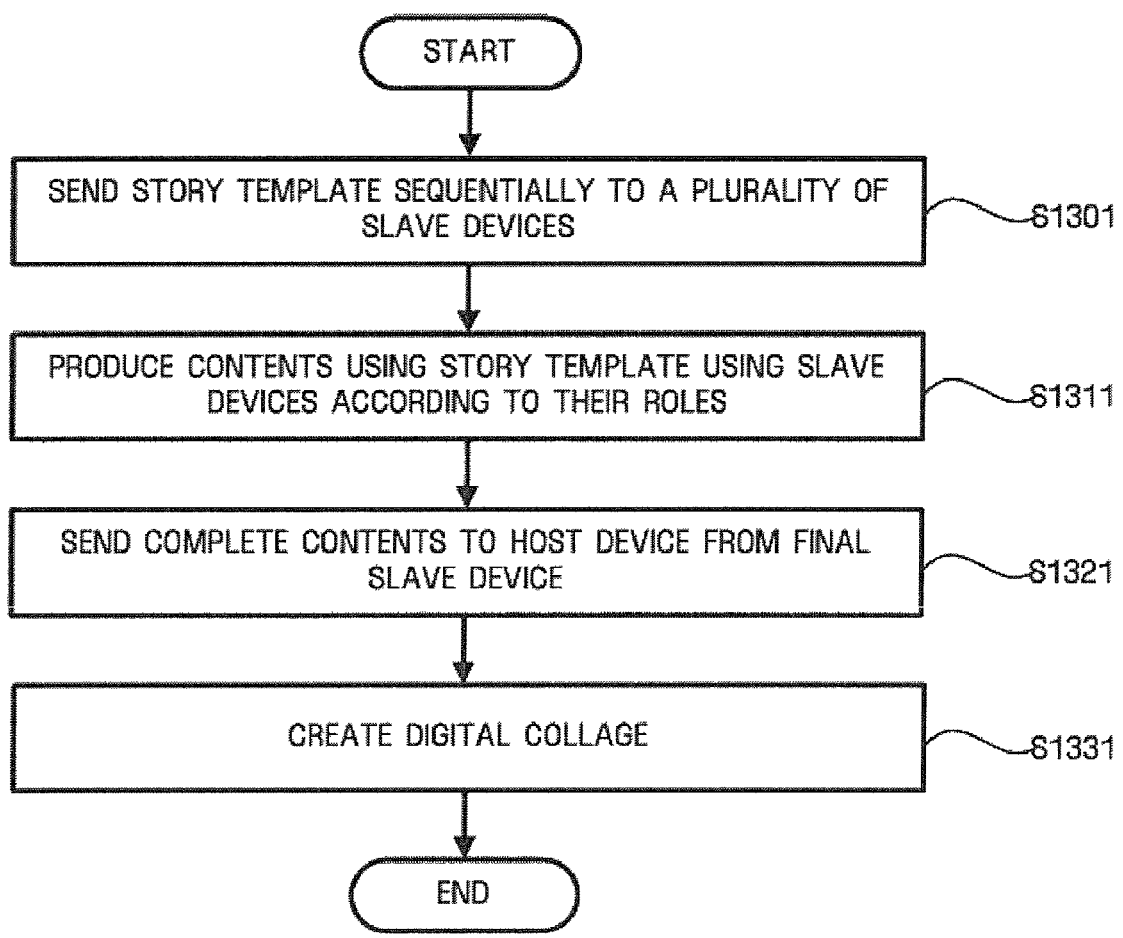
FIG. 13 is a flowchart of a method of creating a digital collage using a story template according to an embodiment of the present invention.

FIG. 13 is a flowchart of a method of creating a digital collage using a story template according to another embodiment of the present invention.

First, the receiving/sending unit 110 sends the story template sequentially to a plurality of slave devices according to the order in which the contents are to be produced which is set by the host device (S1301).

Then, the plurality of slave devices produces the content using the story template according to their roles (S1311). Consequently, the final slave device produces the final complete content.

The final slave device sends the complete contents to the host device through the sending/receiving unit 110 (S1321).

In the next procedure, the creating unit 140 creates the digital collage using the final content (S1321). If a plurality of contents is received, the contents may be merged in a predetermined form to create the digital collage.

As described above, an apparatus for creating a digital collage and a method of creating a digital collage according to the embodiments of the present invention may have at least one or more effects.

Firstly, since contents produced by a plurality of users are merged, it is possible to create a more unique digital collage than a digital collage made by a single user.

Secondly, the digital collage can reflect the user' personality, sentiment and experience.

Thirdly, it is possible for users to make short stories using their mobile devices according to their roles and put all of the stories into a single digital collage.

Finally, the plurality of users produces single story content cooperatively, thereby strengthening a relationship between the users.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for creating a digital collage, the apparatus comprising:
    a sending/receiving unit of a host device which sends a message requesting contents to a plurality of slave devices that are selected by a user of the apparatus, and which receives contents from a plurality of slave devices; and
    a creating unit which merges the received contents according to a preset form that is based on an intended recipient of the digital collage, to create the digital collage,
    wherein each of the plurality of slave devices that are selected by the user of the apparatus accept or refuse to make the contents for the digital collage, the sending/receiving unit receives contents from the plurality of slave devices that accept to make the contents for the digital collage, and the sending/receiving unit further sends the created digital collage to the intended recipient based on a user selection.

2. The apparatus of claim 1, further comprising:
    a sync unit which synchronizes a creation date of the digital collage with the digital collage or synchronizes the creation date of a part of the digital collage contributed by each of the members who participated in creating the digital collage, and stores the synchronized digital collage.

3. The apparatus of claim 1, further comprising:
    a control unit which determines whether or not the received contents are from the slave devices that received a request message from the host device.

4. The apparatus of claim 1, wherein the slave devices are mobile devices.

5. The apparatus of claim 1, wherein the contents include at least one of text, icons, images, or video.

6. The apparatus of claim 1, wherein the creating unit includes an effect unit that applies a predetermined effect to the digital collage or the contents.

7. The apparatus of claim 1, further comprising:
    an output unit which outputs at least one of the digital collage, the contents, or information about members who participate in creating the digital collage.

8. The apparatus of claim 7, wherein when a pointer is placed on a predetermined part of the digital collage, the output unit outputs information of a member who made content corresponding to the part.

9. The apparatus of claim 7, wherein when a certain date is selected, the output unit outputs the digital collage which is synchronized with the date.

10. The apparatus of claim 1, wherein the digital collage is formed as an image file, video file, or an application file.

11. An apparatus for creating a digital collage using a story template, the apparatus comprising:
    a sending/receiving unit which sends a message requesting contents to a plurality of slave devices that are selected by a user of the apparatus, and which receives contents that are created by the plurality of slave devices in which each respective slave device selects one or more objects from the story template; and a creating unit which creates the digital collage using the received contents according to a preset form that is based on the story template, wherein each of the plurality of slave devices that are selected by the user of the apparatus accept or refuse to make the contents for the digital collage, the sending/receiving unit receives contents from the plurality of slave devices that accept to make the contents for the digital collage, and the sending/receiving unit further sends the created digital collage to an intended recipient based on a user selection.

12. The apparatus of claim 11, wherein the story template includes at least one of background images, characters, music, dialogue boxes, or photo images.

13. The apparatus of claim 11, wherein the creating unit includes an arranging unit that merges a plurality of the contents in a predetermined form.

14. The apparatus of claim 11, wherein the story template is sent sequentially to a plurality of slave devices according to a sequence created using a host device.

15. A method of creating a digital collage using a story template, the method comprising:

receiving user input that selects a plurality of slave devices to send a message requesting contents of the story;

sending the message requesting contents to the plurality of slave devices that are selected by a user;

receiving contents that are created by the plurality of slave devices in which each respective slave device selects one or more objects from the story template;

creating the digital collage using the received contents according to a preset form that is based on the story template; and sending the created digital collage to an intended recipient based on a user selection, wherein each of the plurality of slave devices that are selected by the user accept or refuse to make the contents for the digital collage, and the receiving contents comprises receiving contents from the plurality of slave devices that accept to make the contents for the digital collage.

16. The method of claim 15, wherein the story template includes at least one of background images, characters, music, dialogue boxes, and photo images.

17. The method of claim 15, wherein the creating of the digital collage includes merging a plurality of contents in a predetermined form.

18. The method of claim 15, wherein the story template is sent sequentially to a plurality of slave devices according to an sequence created using a host device.

19. The method of claim 15, further comprising sending the story template to a second slave device from a first slave device which has finished producing assigned contents.

* * * * *